United States Patent Office 3,069,127
Patented Dec. 18, 1962

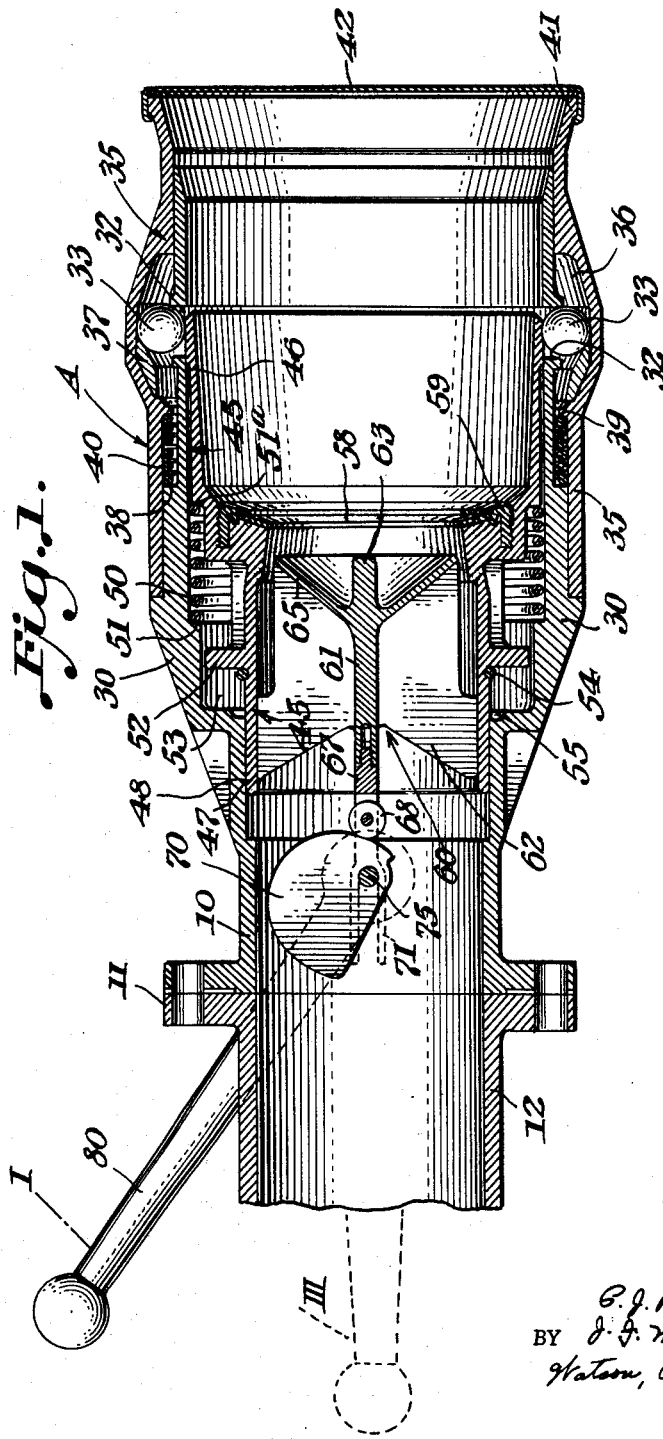

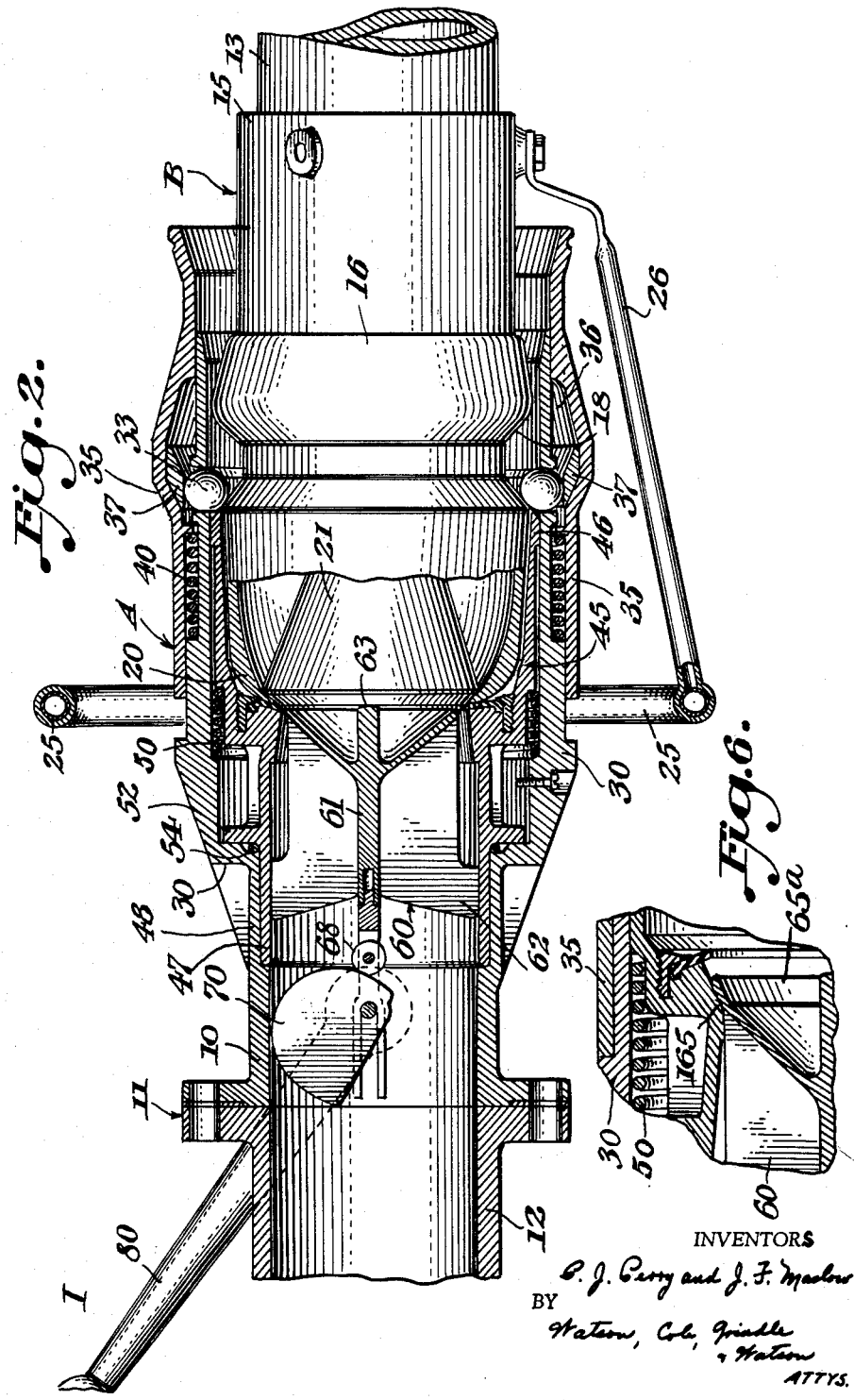

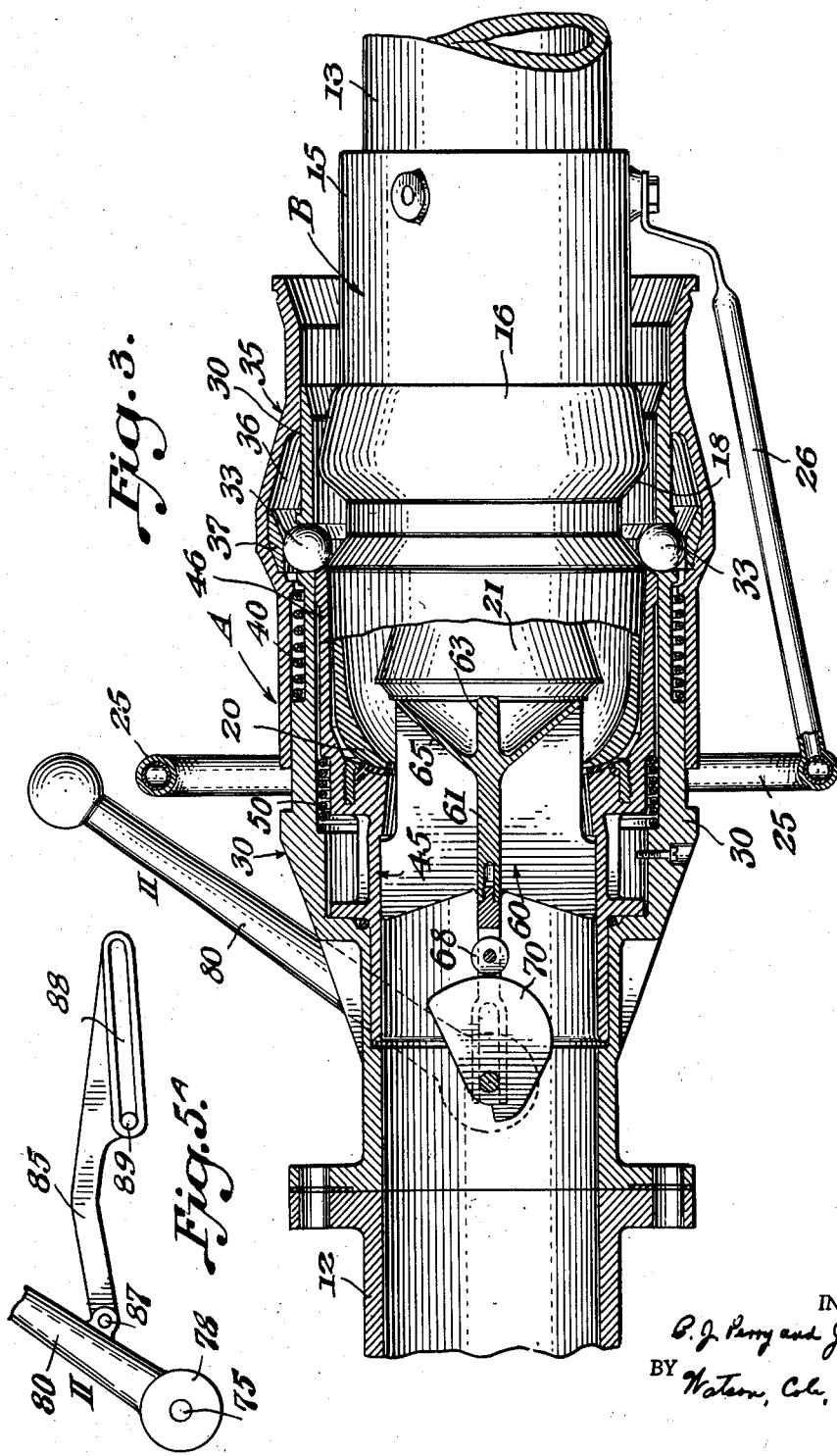

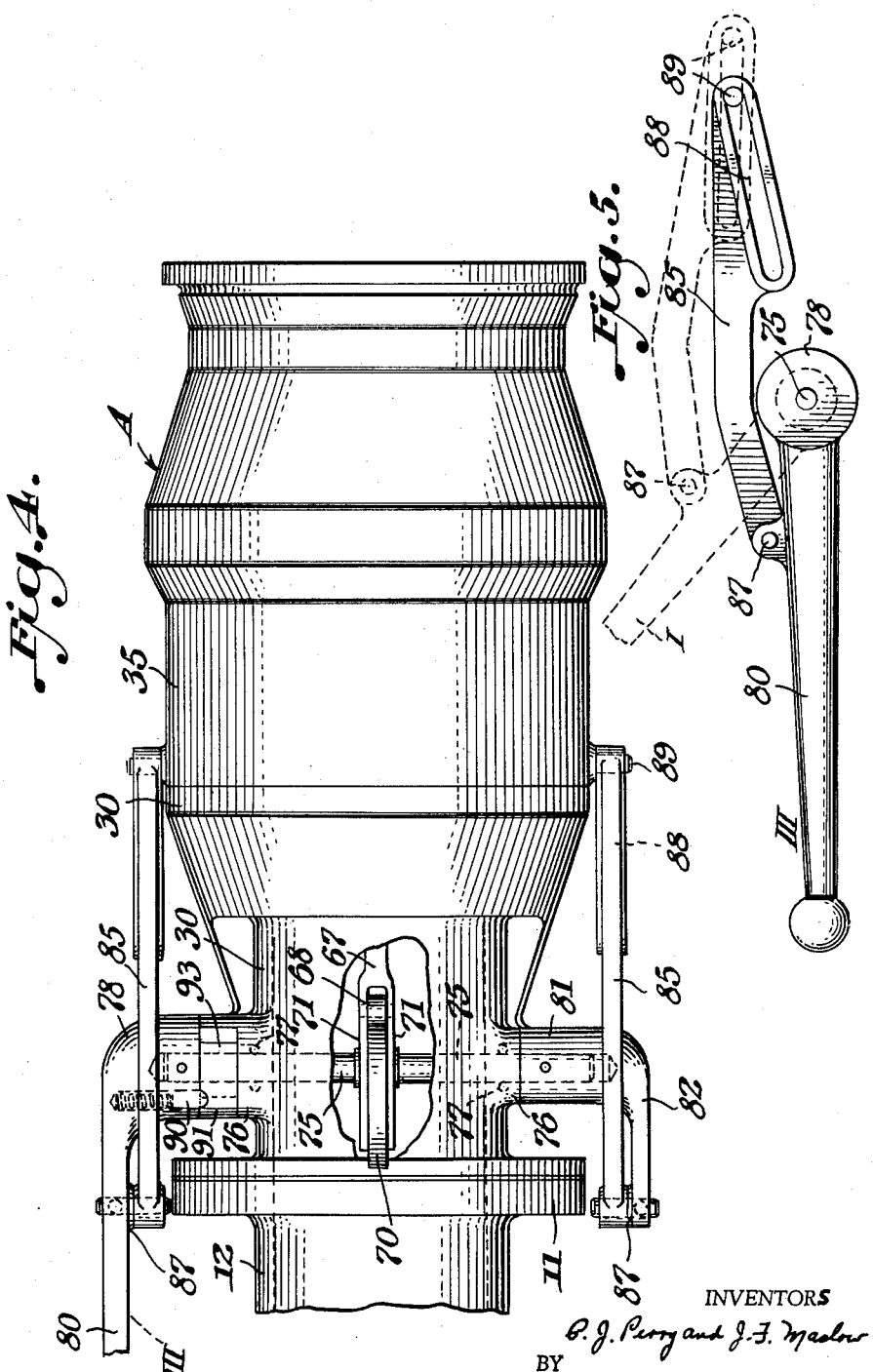

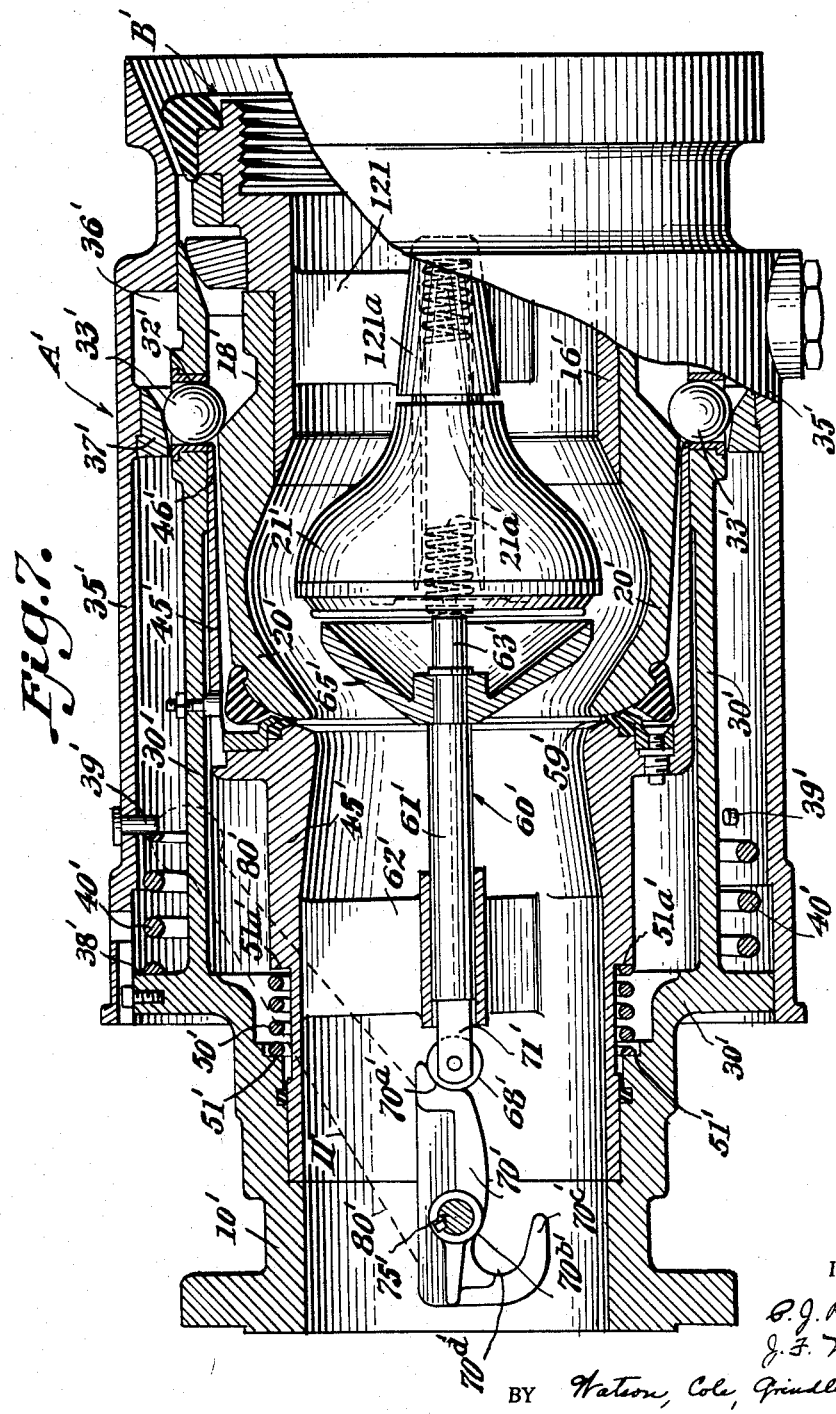

3,069,127
PIPE COUPLINGS
Patrick J. Perry, Laurel, Md., and John F. Maslow, Broad Brook, Conn., assignors to Flight Refueling Incorporated, Baltimore, Md., a corporation of Delaware
Filed Dec. 12, 1957, Ser. No. 702,449
7 Claims. (Cl. 251—149.9)

This invention relates to couplings for fluid transmitting conduits, and more particularly to those of the plug and socket type having automatically engageable and manually releasable latching means.

The general object of the invention is to provide a novel and improved coupling assembly of light weight but of as rugged construction as possible within the performance requirements.

The coupling contemplated by the invention in its preferred embodiment comprises two mating members, including a socket member which is preferably although not necessarily fixed, and a portable nozzle member connected to a flexible hose and insertable into the socket member when transfer of fluid is desired, as for example, in the fueling of a marine or other craft from a tanker, or from a shore installation.

It is part of the present inventive concept that the portable nozzle unit should be the more simple and lightweight part, and any complexity such as retaining or actuating mechanisms be carried by or made a part of the preferably fixed socket unit.

Among the objects of the invention is the development of a pipe coupling of this class having novel means whereby the connection may be made and controlled by one man with a minimum of effort; the operation comprising aligning the nozzle and socket members and thrusting the one into the other, whereby they become firmly engaged and locked against withdrawal until positively released, and then actuating internal valving for initiating the flow through the coupling. The same manually actuatable element serves to control the valving and actuate and release the coupling lock.

Other objects and features of novelty, including ingenious structural details and accessories, will be apparent from the following specification when read in connection with the accompanying drawings in which certain embodiments of the invention are illustrated by way of example.

In the drawings:

FIGURE 1 is a view in longitudinal section of a socket member forming a part of a coupling embodying the principles of the invention, the parts being in cocked or repose position preparatory to introducing the nozzle section;

FIGURE 2 is a view similar to FIGURE 1 showing the coupling in the condition where the nozzle has been introduced into the socket portion and the parts are locked together preparatory to starting flow through the coupling;

FIGURE 3 is a sectional view similar to FIGURE 1 in which valving means associated with the coupling has been actuated to provide for flow through the assembled nozzle and socket members;

FIGURE 4 is a view in plan of the socket member of the coupling showing the manually actuatable elements for releasing the interlock and actuating the valve;

FIGURE 5 is a fragmentary view of the manually actuatable means showing two positions thereof;

FIGURE 5A is a view similar to FIGURE 5, but on a smaller scale, showing the manually actuatable means in a third position;

FIGURE 6 is a fragmentary sectional view showing a modified form of valve actuating plunger;

FIGURE 7 is a view similar to FIGURE 3 showing another embodiment of the invention.

Figure 8:
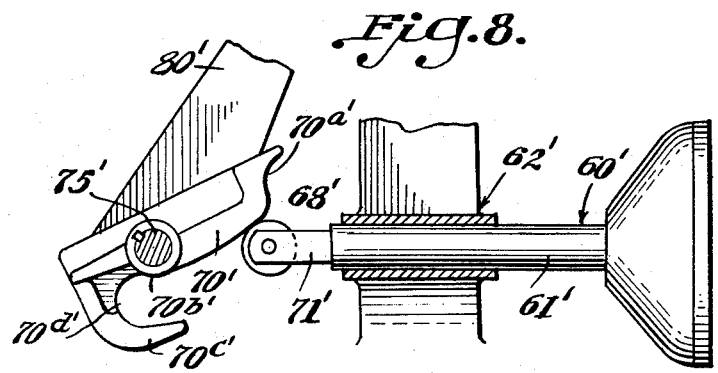
FIGURES 8, 9 and 10 are fragmentary views showing successive positions of the camming means which control the operation of the poppet valve actuating plunger in this embodiment.

The novel coupling assembly consists of two units or sub-assemblies, one of which may be termed a socket or nozzle-receiving member as shown at A in the drawings, and comprising the entirety of the illustration in FIGURES 1 and 4. The other unit which may be referred to as the nozzle is designated B in FIGURES 2 and 3 of the drawings.

One use to which the novel coupling arrangement may be applied is as an installation for transferring liquid fuel from a tanker or supply vessel to another ship in which the fuel is to be used. When thus employed, it is preferred that the socket unit A be a fixed unit having a shank portion 10 secured as by means of bolted flanges 11 to a fixed fuel supply pipe 12.

The nozzle unit B, in the exemplary embodiment, is attached to a fuel hose 13 by means of a standard hose end fitting 15. The nozzle shell 16 is approximately cylindrical but has an annular groove 18 machined around the outside thereof for the reception of certain retaining and interlocking elements to be described. The nose portion 20 of the nozzle is preferably gently curved and tapered as clearly shown in the drawings.

Seated within the converging margins of the nose portion 20 is a spring-loaded poppet valve 21 which may be of any suitable construction just so that it is resiliently urged toward seated position against the inner periphery of the nozzle opening as shown in FIGURE 2. The spring for biasing the poppet valve 21 toward closed position may be similar to the one suggested at 21a′ in the embodiment illustrated in FIGURE 7.

The portable nozzle unit B is provided with an annular handle member 25 which is secured to the hose end fitting 15 by means of peripherally spaced resilient canted legs 26. The handle member is so positioned with respect to the nozzle body that it may also function as a bumper or guard element to protect the unit during any inadvertent rough handling, as well as serving for manual lifting and guiding of the portable nozzle unit B into the socket unit A.

Referring now more particularly to FIGURE 1 of the drawings, where the socket unit A is shown in preparatory or cocked position, it will be seen that the unit consists essentially of a bodp member 30, the shank portion 10 of which is secured as already described to the pipe end 12 by means of the bolted flanges 11. The body member 30 is provided with an annular series of openings or ports 32 which serve to house the retaining balls 33.

About the exterior of the body portion 30 there is fitted an outer locking sleeve 35 which is provided with an internal annular groove or channel 36 adapted to receive the projecting portions of the series of locking balls 33 which are retained in the ports 32 of the body member 30. A hardened ferrous insert 37 is preferably disposed within the groove 36 for withstanding any brinelling action of the retaining balls 33.

Cooperating shoulders 38 and 39 are formed respectively on the body portion 30 and the locking sleeve 35 between which is compressed a coil spring 40 which serves to continually urge the locking sleeve 35 in a forward direction. The mouth or lip portion 41 of the locking sleeve projects forwardly of the outer limit of the body member at all times and, in order to protect the interior of the socket unit, a flexible or resilient cover 42 may be snapped onto the locking sleeve.

An inner sleeve member 45 is also adapted to move axially with relation to the body member 30, an outer flange 46 of this inner sleeve projecting at times radially inwardly of the annular series of locking balls 33 thus keeping them well within the groove 36 in the outer locking sleeve and preventing them from entering the locking groove 18 of the nozzle unit. The rearward cylindrical portion 47 of the inner sleeve 45 is guided within the cylindrical portion 48 of the body member 30. A coil spring indicated at 50 is compressed between the shoulder 51 on the body member and the shoulder 51a on the inner sleeve 45, and serves to continually urge the inner sleeve in a forward direction.

A radially extending flange 52 extends from the inner sleeve 45 and is adapted to travel within the space 53 formed within the body member. A packing ring or seal 54 is adapted to be compressed between the flange 52 and the wall of the groove 55 in the body member when the sleeve 45 is in its ultimate rearward position.

Intermediate the length of the inner sleeve 45 and internally thereof there is provided an annular master seal 58 which is clamped in place by the threaded ring 59 as shown to better advantage in FIGURES 2 and 3 of the drawings. The nose 20 of the nozzle seals against this element when in applied position. Also, the inner configuration of the forward portion 46 of the internal sleeve 45 is such as to support and guide the forward tapered section of the nozzle during introduction of the latter into the socket unit.

An axially movable plunger assembly 60 is retained within the inner sleeve 45 and consists essentially of an axial rod portion 61 from which fins 62 radiate, the tails of the fins being guided within the rear portion 47 of the sleeve 45. The forward end 63 of the central rod portion 61 of the plunger element is adapted to abut the poppet valve 21 of the nozzle unit as will be clearly seen in FIGURES 2 and 3 and will be readily understood when the description of the operation of the device is presented. At this point it may also be mentioned that the plunger assembly 60 is provided with a conical fairing 65 which, as shown in FIGURE 3, serves to streamline the internal passageways of the two units when the poppet valve is open so as to minimize pressure loss which might otherwise be incurred by turbulence.

A rod-like extension 67 is threaded as at 68 into the end of the portion 61 of the plunger assembly and this part 67 is divided, as clearly shown in FIGURE 4 of the drawings, to receive a follower roller 68 and to embrace the actuating cam 70. Each of the portions 71 of the bifurcated member 67 is itself forked to straddle and ride upon the central portion of the transverse rock shaft 75.

Referring now more particularly to FIGURE 4 in the drawings, it will be seen that the shaft 75 has bearings in the bosses 76 of the body member 30 and is sealed with the conventional O-rings 77.

Upon the projecting ends of the shaft 75 there are respectively fitted the socketed enlarged end 78 of the manually actuatable lever 80, and a similar socketed enlarged portion 81 of a crank member 82. Parallel slotted links 85 each have one of their ends pivotally connected to the handle lever 80 and the crank 82 respectively as at 87 and the opposite ends of these links are provided with slots 88 which receive pins 89 carried by the extreme rear end portion of the locking sleeve 35.

A spring loaded detent 90 is socketed in the enlarged inner end 78 of the handle 80 and its rounded nose is adapted to snap into similarly rounded recesses formed in the portion 91 carried by the body member 30 adjacent one of the bosses 76. This detent will also indicate by feel when the handle is in flow position or locked position and also tend to hold it in such selected positions.

Also, within or externally around the portion 91 may be disposed any suitable sort of spring device 93 which will tend to urge the handle 80, crank 82 and linkages 85 to cocked or preparatory position wherein the nozzle may be snapped into place.

The operation of the novel coupling will now be described. As already indicated, the positions the various parts assume in FIGURE 1 of the drawings are ones in which the socket assembly is in cocked position preparatory to receiving the nozzle, the position of the operating handle 80 being designated by the Roman numeral I. Although in order to positively retract the outer locking sleeve 35 to the position shown in FIGURE 1, the handle would ordinarily have to be moved to the broken line position designated III, the presence of the locking balls 33 within the groove 36 of the locking sleeve substantially assures the sleeve being held in this retracted position, the balls being retained in this outward position by the presence of the forward portion 46 of the inner sleeve 45 inside of the ports 32. The spring 40 tends to urge the locking sleeve 35 forwardly, but the spring 50 maintains the inner sleeve 45 in its forward cocked position.

The cover 42 is then removed and the nozzle unit B on the hose 13 is introduced into the socket by manipulating the unit by means of the annular handle member 25. Introduction of the nose 20 of the nozzle shell into the inner sleeve 45 causes the contours of these two elements to mate snugly and the rounded extremity of the nozzle shell 20 will contact and seat against the master seal 58. Continued insertion movement of the nozzle will displace the inner sleeve 45 inwardly until such time as the annular sealing element 54 is compressed between the shoulder 52 of the inner sleeve and the body member 30. During this retraction of the inner sleeve 45 under the compulsion of the nozzle B, the portion 46 of the inner sleeve uncovers the ports 32 and the retaining balls 33 are forced radially inwardly through these ports by means of the spring-loaded locking sleeve 35, the hardened insert 37 forcing the balls to project inwardly through the ports 32 and into the annular groove 18 of the portion 16 of the nozzle member, thereby firmly retaining the two units in engaged position as shown in FIGURE 2 of the drawings. The pin 89 is now disposed in the right-hand end of the slot 88 as shown in dotted lines in FIGURE 5.

It will be thus understood that the inserting action of the nozzle within the socket member by a single forward stroke effects the necessary sealing and connecting of the coupling. At this point the two units are firmly engaged, but the nozzle valve is still in closed position.

The next procedure is to swing the control handle 80 from position I depicted in FIGURES 1 and 2 of the drawings over to position II shown in FIGURE 3, this movement being, in the embodiment illustrated, through an arc of approximately 90°. This causes the cam 70 to rotate so that the contact with the cam follower roller 68 moves from the low portion of the cam to the high portion thereof, thus forcing the plunger assembly 60 forwardly so that the end 63 abuts the spring-loaded poppet valve 21 of the nozzle and causes it to be unseated from its internal seat within the nose 20 and to open the nozzle for flow.

The locking angle of the ball-contacting surface of the insert 37(37') in all of the illustrated embodiments of the invention, insures that no back pressure urging the balls radially outwardly can give rise to any axial movement of the sleeve 35. However, it will be readily understood from an inspection of FIGURE 5A that when the operating lever 80 is in position II, the pin 89 is seated in the left-hand end of the slot 88 in the link 85 and this effectively prevents the retraction of the locking sleeve 35 by any internally or externally applied force, thus holding the coupling parts firmly in interlocked position during flow of fluid therethrough.

To discontinue flow through the coupling at any time the only action required is the moving of the control handle 80 from position II in FIGURE 3 back to position I of FIGURES 1 and 2, whereupon the spring-pressed poppet valve 21 (see also spring 21a' in FIGURE 7) will close against its seat around the inner periphery of the nose 20 of the nozzle, and during the same operation it will abut the end 63 of the plunger (or socket valve) assembly 60 and cause the latter to follow the cam 70 to retracted position. This action, while terminating the flow, will leave the units firmly engaged but not "double" locked. When it is desired to completely release the coupling units A and B from engagement the lever 80 is moved from position I to position III shown in FIGURES 4 and 5 of the drawings and suggested in broken lines in FIGURE 1. During this last named movement the curvature of the cam 70 is constant at a minimum and thus no movement of the plunger 60 is effected. However, the linkages 85 which have a lost motion pin and slot connection with the outer locking sleeve 35 are moved from the dotted line position of FIGURE 5 to the solid line position thereof which will cause the sleeve 35 to be retracted to the position shown in FIGURE 1, which will permit the retaining balls 33 to move radially outwardly through the ports 32 under the influence of the withdrawal of the grooved nozzle, and further under the wedging pressure of the bevelled end of the inner sleeve 45; and as this occurs the nozzle can then be readily removed from the throat of the socket member of the coupling, and the inner sleeve 45 will maintain the retaining balls in cocked position ready for the next coupling operation.

It will also be understood that the action of the spring element 93 will restore the lever 80 to position I shown in dotted lines in FIGURE 5, but under these circumstances, the pin 89 will remain in the relative position shown in solid lines in FIGURE 5.

In FIGURE 6 of the drawings, there is illustrated a modification of the plunger assembly 60 wherein the fairing 65a is extended to provide a valve member seating against the internal periphery 165 of the inner sleeve and thus furnishing a closure for the socket and piping 12, in a somewhat similar manner to the way in which the poppet 21 seals off the nozzle unit when the coupling is disengaged.

In FIGURES 7–10 inclusive of the drawings an embodiment of the invention is shown which in most respects is similar to the one illustrated in FIGURES 1–4 but which incorporates a novel retaining feature for the valve actuating plunger of the socket member.

All elements of this embodiment of the invention which are the same or similar to, or are practical counter-parts in arrangement and function to corresponding elements in the earlier described embodiment, will be given the same reference numerals but with a prime added. These reference characters will cover all important parts of the device including the nose 20' of the nozzle member, the poppet valve 21' of that member, the grooves 18' of the nozzle member, and the interlocking balls 33' carried by the body portion 30' of the socket member. The main seal of the coupling is shown at 59' and serves as in the other embodiment to pack the connection between the nose 20' of the nozzle member and the retractible sleeve 45' of the socket. A peripheral series of stop pins 39' functions in the same way as the shoulder 39 of FIGURE 1. Also, the poppet valve 21' is urged toward closed position by means of a spring 21a' which is compressed between the rear surface of the valve 21' and the inner end of the tubular forward extension 121a of the spider 121 which serves to support the valve in the nozzle. Only the forward nose and valve carrying portion of the nozzle B' is shown in FIGURE 7, but it will be clearly understood that this forward portion is, in practice, threaded upon a shank portion comprising a hose end fitting corresponding in all respects to the part designated 15 in FIGURE 1, and including the handling equipment comprising the ring 25 and resilient legs 26.

Unlike the previously described embodiment, the plunger assembly 60' comprises a plunger shaft 61' guided in a finned axial bearing installation 62'. The shaft 61' may carry the fairing 65' at its forward end, which of course may be made to function as a supplemental valve as already suggested in FIGURE 6 of the drawings at 165. The forward end 63' of the plunger abuts the poppet valve 21' and the rearward end is bufurcated as at 71' to carry the follower wheel 68' which abuts the cam 70' carried upon the cam shaft 75' to which the manually actuated lever 80' is keyed.

It will be observed immediately that the camming arrangement in this embodiment differs considerably from the one earlier described. In position II as shown in FIGURE 7 a concave or pocketed portion 70a' is provided at one end of the working surface of the cam and the follower roller or wheel 68' seats in this pocket when the plunger is fully extended and is holding the poppet valve 21' in full open position.

In moving from position II to position I the follower roller 68' follows the curvature of the cam 70' under the influence of the spring 21a' which urges the poppet valve 21' toward the socket member, and an intermediate position of the parts is shown clearly in FIGURE 8 of the drawings.

Figure 9:
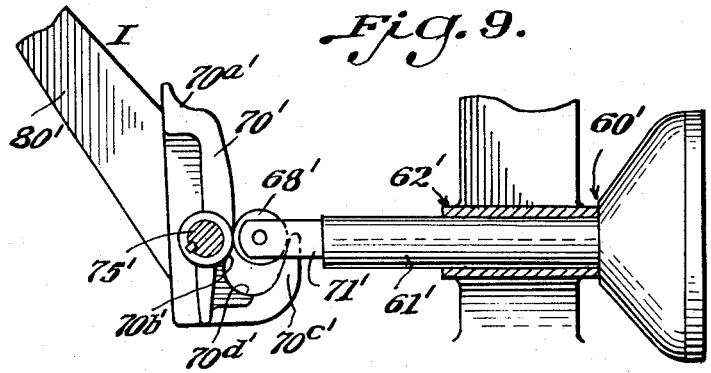
Figure 10:
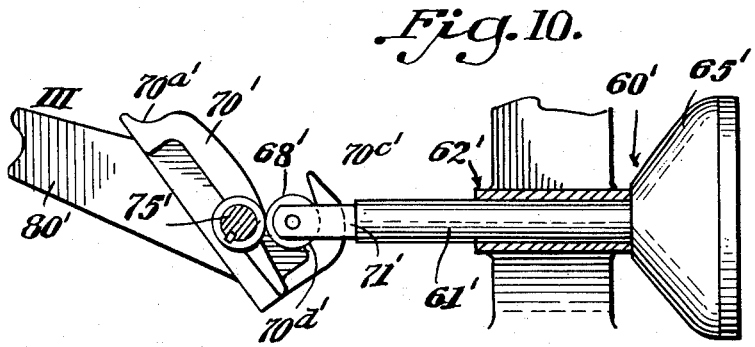

When the parts arrive at position I, as shown in FIGURE 9 of the drawings, the follower roller 68' has arrived at the beginning of the concentric portion 70b and the nose of a hook 70c' has entered between the bifurcations 71' and started to embrace the follower wheel or roller 68', and is sufficiently engaged with the roller to prevent any outward displacement of the plunger assembly 60'.

Further movement of the lever 80' and the associated parts to position III will bring the hook 70c' completely around the roller 68' and the roller will be seated in the arcuate concave depression or pocket 70d, which represents the limit of the operative surface of the cam 70'.

Thus, when the nozzle member B' and its poppet valve 21' are withdrawn from engagement with the socket member A' and no external means is present to keep the plunger arrangement 60' safely in retracted position (and this is of all the greater importance when the fairing 65' of the plunger 60' acts as a valve for the socket member as in the embodiment shown in FIGURE 6), the plunger assembly 60' is safely retained by means of the hook 70c' in retracted position in both stages I and III of the manual operation.

It will be understood that various changes and modifications may be made in the embodiment illustrated and described herein without departing from the scope of the invention as defined by the following claims.

Having thus described the invention, what is claimed as new and desired to be secured by Letters Patent is:

1. A pipe coupling assembly of the plug and socket type comprising a socket member and a plug member, which plug member comprises a nozzle adapted to be received within said socket member, detent means in said socket member automatically actuatable by substantially full insertion of the nozzle for locking the nozzle in firm engagement within said socket member, and manually actuatable means carried by said socket member and operable at will to cause said detent means to release said nozzle, said manually actuatable means being the only means whereby said nozzle may be released, a poppet valve being axially movable within said nozzle and resilient means provided for urging it toward seating position within the mouth of said nozzle, and an axially disposed plunger member guided within said socket member for axial movement therein to abut and open said poppet valve against the yieldable urging of said resilient means, and operative connections provided between said plunger member and said manually actuatable member.

2. A pipe coupling assembly of the plug and socket type comprising a socket member and a plug member, which plug member comprises a nozzle adapted to be received within said socket member, detent means in said socket member automatically actuatable by substantially full insertion of the nozzle for locking the nozzle in firm engagement within said socket member, and manually actuatable means carried by said socket member and operable at will to cause said detent means to release said nozzle, said manually actuatable means being the only means whereby said nozzle may be released, a poppet valve axially movable within said nozzle and resilient means provided for biasing it toward seating position within the mouth of said nozzle, and an axially disposed floating normally unbiased plunger member guided within said socket member for axial movement therein to be positively brought into abutment with and to open said poppet valve against the yieldable urging of said resilient valve biasing means, operative connections between said plunger member and said manually actuatable member, said operative connections comprising a cam rotatably mounted in said socket member and adapted to be actuated by said manually actuatable member, said plunger being under longitudinal compressional stress between the spring-pressed poppet valve and said cam substantially as long as the valve-containing nozzle is engaged with said socket member, and in which there is provided retaining means comprising a part of said operative connections for engagement with said floating plunger to prevent its outward displacement with respect to the socket member when the nozzle with its poppet valve is disengaged.

3. A pipe coupling assembly of the plug and socket type comprising a socket member and a plug member, which plug member comprises a nozzle adapted to be received within said socket member, detent means in said socket member automatically actuatable by substantially full insertion of the nozzle for locking the nozzle in firm engagement within said socket member, and manually actuatable means carried by said socket member and operable at will to cause said detent means to release said nozzle, said manually actuatable means being the only means whereby said nozzle may be released, a poppet valve axially movable within said nozzle and resilient means provided for biasing it toward seating position within the mouth of said nozzle, and an axially disposed floating normally unbiased plunger member guided within said socket member for axial movement therein to be positively brought into abutment with and to open said poppet valve against the yieldable urging of said resilient valve biasing means, operative connections between said plunger member and said manually actuatable member, a transverse cam shaft rotatably mounted in the socket member, a cam fixed to said shaft and adapted to contact and urge said plunger member in its axial movement toward poppet valve opening position, and in which said manually actuatable means comprises a hand lever keyed to said cam shaft and having linkages connecting it to the detent means, said linkages having pin and slot connections with said latter means whereby during valve actuating movement of the lever the detent means is not moved, and said cam being provided with a portion of uniform radius whereby during detent unlocking movement of said lever said valve actuating plunger is not displaced.

4. The pipe coupling assembly as set forth in claim 3 wherein said plunger is under longitudinal compressional stress between the spring-pressed poppet valve and said cam substantially only as long as the valve-containing nozzle is engaged with said socket member, and in which there is provided a retaining projection on said cam adjacent said portion of uniform radius for engagement with said plunger to prevent its outward displacement with respect to the socket member when the nozzle with its poppet valve is disengaged.

5. The pipe coupling assembly as set forth in claim 2 in which said cam is provided adjacent each end of its operative surface with retaining sockets acting as detents for the end of the plunger member with which the cam has operative contact.

6. The pipe coupling assembly as set forth in claim 1 in which a transverse cam shaft is rotatably mounted in the socket member, a cam is fixed to said shaft and adapted to contact and urge said plunger member in its axial movement toward poppet valve opening position, and in which said manually actuatable means comprises a hand lever keyed to said cam shaft and having linkages connecting it to the locking sleeve, said linkages having pin and slot connections with said sleeve whereby during valve actuating movement of the lever the sleeve is not moved, and said cam being provided with a portion of uniform radius whereby during detent unlocking movement of said lever said valve actuating plunger is not displaced.

7. A pipe coupling assembly of the plug and socket type comprising a socket member and a plug member, which plug member comprises a nozzle adapted to be received within said socket member, detent means in said socket member automatically actuatable by substantially full insertion of the nozzle for locking the nozzle in firm engagement within said socket member, and manually actuatable means carried by said socket member and operable at will to cause said detent means to release said nozzle, said manually actuatable means being the only means whereby said nozzle may be released, said nozzle being provided with radiating resilient arms, the ends of which are fixed to a ring member which serves the purpose of a manipulating handle for said nozzle and also a guard for protecting the nozzle against damage, said arms being inclined forwardly toward the end of the nozzle whereby when the nozzle is in inserted position within the socket the ring member surrounds the socket also.

References Cited in the file of this patent

UNITED STATES PATENTS

| | | |
|---|---|---|
| 2,384,628 | Krone et al. | Sept. 11, 1945 |
| 2,413,571 | Krone et al. | Dec. 31, 1946 |
| 2,434,167 | Knoblauch | Jan. 6, 1948 |
| 2,665,928 | Omon et al. | Jan. 12, 1954 |
| 2,679,407 | Badger | May 25, 1954 |
| 2,686,529 | Lanninger | Aug. 17, 1954 |
| 2,744,770 | Davidson et al. | May 8, 1956 |
| 2,750,209 | Robb | June 12, 1956 |
| 2,905,486 | Goodin et al. | Sept. 22, 1959 |

FOREIGN PATENTS

| | | |
|---|---|---|
| 356,/36 | Australia | Sept. 24, 1936 |